May 30, 1950     O. J. HUELSTER     2,509,434
PRONG RING SNAP FASTENER ATTACHMENT
Filed June 6, 1946

INVENTOR.
Otto J. Huelster.
BY

Patented May 30, 1950

2,509,434

UNITED STATES PATENT OFFICE 2,509,434

PRONG RING SNAP FASTENER ATTACHMENT

Otto J. Huelster, Waterbury, Conn., assignor to Scovill Manufacturing Company, Waterbury, Conn., a corporation of Connecticut Application June 6, 1946, Serial No. 674,791

2 Claims. (Cl. 24—216)

This invention relates to fastener devices of the type and kind, wherein a prong ring is employed for attaching at least one part of a fastener to a suitable support, for example, in producing what are commonly known as snap fastener devices. More particularly, the invention deals with a novel formation of the breast plate and peripheral ring of a fastener device, so as to offset the prongs of a prong ring in reverse direction to form of each of the prongs substantially S-shaped elements in establishing coupling engagement between the fastener part and the mounting prong ring, thereby materially increasing the holding power of the attached fastener device on its support. Still more particularly, the invention deals with the provision of an offset annular indenture in the breast portion of the fastener which further adds to the strength of the resulting fastener by reinforcement of the peripheral portion thereof.

The novel features of the invention will be best understood from the following description, when taken together with the accompanying drawing, in which certain embodiments of the invention are disclosed and, in which, the separate parts are designated by suitable reference characters in each of the views and, in which.

Figure 1:
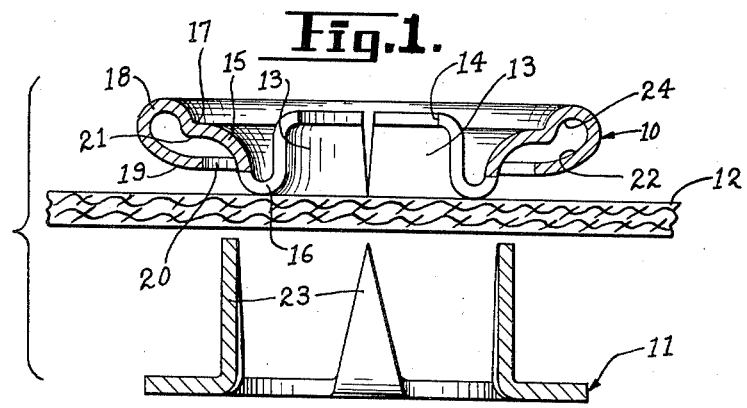
Fig. 1 is an exploded view showing a socket part and a prong ring part of a fastener in section on opposed surfaces of a mounting member, preparatory to attachment to said member.

In fasteners of the type and kind under consideration, it has been customary to provide a socket or other fastener part with an outwardly flaring prong deflecting breast portion terminating in an inwardly inturned hook-shaped flange forming a peripheral socket for the reception of the ends of the prongs of a prong ring for attaching the fastener part to a supporting member. In such attachments, the prongs have been flared or curved outwardly to form securing ends substantially L-shaped in cross-sectional form or, in some instances, curled to an extent forming anchorage portions substantially U-shaped or loop-shaped in form.

It is the purpose of my invention to so shape breast portions and peripheral or ring portions of fastener devices of the kind under consideration as to offset the prongs in the resulting fastener sockets in two distinctly different curved directions to form of the prongs anchorage portions, which are substantially S-shaped in cross-sectional form and, still further, in accomplishing this result in a manner to form an annular indenture in the breast portion of the fastener to strengthen and reinforce said breast portion.

In the drawing, 10 represents one part of a fastener which, in the construction shown, comprises a socket part of a snap fastener; 11 shows a prong ring and 12 a mounting member, as for example a fabric or other sheeting with which the parts 10 and 11 are adapted to be coupled.

The part 10 has centrally thereof circumferentially spaced yieldable members 13 terminating at their free ends in inwardly set flange portions 14, the members 13 forming a socket portion for the reception of the stud member of a companion fastener part, not shown. At 15 is shown an annular or circumferential breast wall or prong deflecting portion which integrally joins the yieldable members 13 in rounded wall parts 16, the breast portion 15 being curved outwardly and extending in a direction to overlie and circumferentially cover at least part of the members 13.

The breast wall portion 15 has an annular indenture 17, beyond which is a substantially semi-circular peripheral bead or rim 18 terminating in an inwardly curved annular flange 19 which terminates short of the outer surface of the breast portion 15 to form an annular admission opening 20.

The annular recess or indenture 17 forms on the breast wall portion 15 a shoulder portion 21 which is directed radially and in the direction of the inwardly curved wall 22 of the flange 19. This construction is desirable from the standpoint of guiding the prong 23 of the prong ring 11 as they extend from the shoulder 21 outwardly in an upward direction to fit in the socket 24 in the manner illustrated in Fig. 2 of the drawing.

Figure 2:
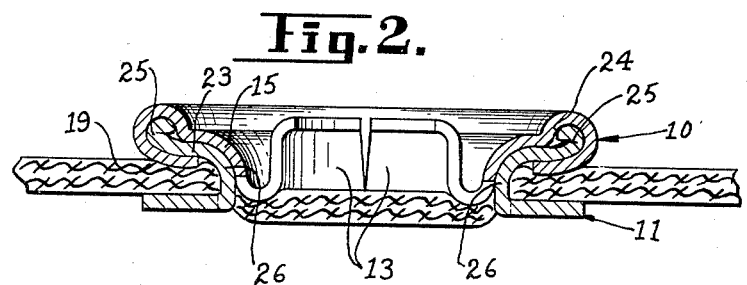
Fig. 2 is a sectional view, similar to Fig. 1, showing the parts assembled on a mounting member.
Figure 3:
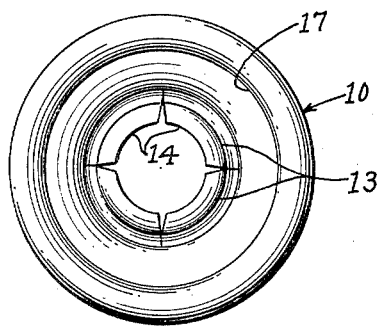
Fig. 3 is a plan view of the socket part, as shown in Fig. 1.

In coupling the parts 10 and 11 together on the support 12, as shown in Fig. 2, the prongs assume a more or less S-formation in cross-section, first in conforming to the curvature of the breast plate 15 and, then, being turned upwardly in conforming with the curvature of the inwardly curved wall 22 of flange 19 with the ends 25 of the prongs turned-over upon themselves within the recess 24 in the head 18. This reverse curvature of the prongs into the more or less S-formation will securely retain the parts 10 and 11 against pull-apart separation. In other words, it would be substantially impossible to withdraw the prongs and, particularly, the turned-over or what might be called head ends 25 thereof. It will also be apparent that, what I term, the head ends 25 aid in reinforcing the peripheral portion of the socket part against crushing strains.

From a standpoint of description, the fastener may be said to comprise two parts, one the prong ring part and the other a fastener part or a part having fastener means centrally thereof. The latter or fastener part has spaced wall members forming an annular socket therebetween which is substantially S-shaped in cross-sectional form, thus contributing to the prongs the S-shaped contour in forming S-shaped anchorage members thereof.

In considering the socket or, in other words, the space formed between the walls 15, 17, 18 and 19 above the inner end of the wall 19, this socket might also be described as hook-shaped or substantially L-shaped in cross-sectional form, thus producing on the tip end portion of the prongs a hook-shaped or L-shaped anchorage portion. This anchorage joins the annulus of the ring 11 in the curved wall part to which is applied the reference character 26 in Fig. 2 of the drawing. It will be understood that, in referring to the substantially S-shaped anchorage members, this would comprise the outer hook or L-shaped ends, part of which are designated at 25 and the curved portions 26.

Having fully described my invention, what I claim as new and desire to secure by Letters Patent is:

1. A snap fastener element adapted to be secured to a support by an attaching ring having a plurality of projecting prongs, said element comprising a central snap fastener means for detachable engagement with a complemental snap fastener part, an annular prong deflecting portion surrounding the fastener means comprising an upwardly and outwardly curved wall, a hollow bead joined to and extending upwardly from the outer end of said first curved wall, the outer wall of said bead being extended to form a second curved wall opposite the outer terminus of said first curved wall for directing the prongs upwardly into the hollow of said bead, thus bending the prongs into S-shape in the assembly of the fastener element to a support, both of said prong deflecting portions or walls and said bead being circumferentially continuous.

2. A snap fastener element adapted to be secured to a support by an attaching ring having a plurality of projecting prongs, said element comprising a central snap fastener means for detachable engagement with a complemental snap fastener part, an annular prong deflecting portion surrounding the fastener means comprising an upwardly and outwardly directed wall, a circumferential hollow rim joined to the upper end of said wall, the outer wall of the rim being extended to form a second prong deflecting portion for bending the prongs upwardly after they pass by said first prong deflecting portion, whereby said prongs are bent into a reverse curve coincident with the assembly of said fastener element to the support, both of said prong deflecting portions and said rim being circumferentially continuous.

OTTO J. HUELSTER.

REFERENCES CITED

The following references are of record in the file of this patent:

UNITED STATES PATENTS

| Number | Name | Date |
|---|---|---|
| 1,777,718 | Devendor et al. | Oct. 7, 1930 |
| 2,242,352 | Fenton | May 20, 1941 |